(12) United States Patent
Im et al.

(10) Patent No.: US 10,990,341 B2
(45) Date of Patent: Apr. 27, 2021

(54) DISPLAY APPARATUS, METHOD OF CONTROLLING THE SAME AND RECORDING MEDIUM THEREOF

(71) Applicant: SAMSUNG ELECTRONICS CO., LTD., Suwon-si (KR)

(72) Inventors: Sangkyun Im, Suwon-si (KR); Joowhan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/558,495

(22) Filed: Sep. 3, 2019

(65) Prior Publication Data
US 2020/0081680 A1    Mar. 12, 2020

(30) Foreign Application Priority Data
Sep. 12, 2018 (KR) .......................... 10-2018-0108693

(51) Int. Cl.
*G06F 3/14* (2006.01)
*G02B 19/00* (2006.01)
(Continued)

(52) U.S. Cl.
CPC .......... *G06F 3/1446* (2013.01); *G02B 6/4298* (2013.01); *G02B 19/0066* (2013.01); *G09G 5/003* (2013.01)

(58) Field of Classification Search
None
See application file for complete search history.

(56) References Cited

U.S. PATENT DOCUMENTS 6,389,487 B1    5/2002  Grooters
7,861,060 B1 *  12/2010 Nickolls ................. G06F 9/522
                                                              712/22
(Continued)

FOREIGN PATENT DOCUMENTS

JP    2016/109797 A    6/2016
JP    2018-025700 A    2/2018
(Continued)

OTHER PUBLICATIONS

International Search Report (PCT/ISA/210) and Written Opinion (PCT/ISA/237) dated Jan. 9, 2020, issued by the International Searching Authority in International Application PCT/KR2019/011759.
(Continued)

*Primary Examiner* — Duane N Taylor, Jr.
(74) *Attorney, Agent, or Firm* — Sughrue Mion, PLLC

(57) ABSTRACT

Disclosed are a display apparatus, a method of controlling the same, and a recording medium thereof, the display apparatus including: a display comprising a plurality of light source modules arrayed like tiles and mounted with a plurality of light emitting elements; an image processor configured to output a signal for displaying an image on a predetermined area of the display, the signal comprising image data and identification information about at least one light source module corresponding to the predetermined area; and a driver configured to selectively drive the at least one light source module corresponding to the identification information among the plurality of light source modules, based on the image data.

18 Claims, 14 Drawing Sheets

(51) Int. Cl.
*G02B 6/42* (2006.01)
*G09G 5/00* (2006.01)

(56) References Cited

U.S. PATENT DOCUMENTS

| | | | |
|---|---|---|---|
| 9,794,510 B1* | 10/2017 | Jo | ............................ G09F 13/00 |
| 2002/0071615 A1* | 6/2002 | Kobayashi | .............. G06F 16/58 |
| | | | 382/305 |
| 2002/0163513 A1 | 11/2002 | Tsuji | |
| 2007/0241988 A1 | 10/2007 | Zerphy et al. | |
| 2008/0211825 A1* | 9/2008 | Sunakawa | .............. G06F 3/1446 |
| | | | 345/581 |
| 2009/0167194 A1 | 7/2009 | Mizuta | |
| 2010/0229115 A1* | 9/2010 | Augustine | ............. G06F 3/1454 |
| | | | 715/800 |
| 2011/0242492 A1 | 10/2011 | Jung et al. | |
| 2012/0162228 A1* | 6/2012 | Yamane | ................. H04N 19/33 |
| | | | 345/428 |
| 2014/0085344 A1 | 3/2014 | Jung et al. | |
| 2018/0145116 A1 | 5/2018 | Lee et al. | |
| 2019/0088193 A1* | 3/2019 | Tada | ................... G06F 3/04847 |

FOREIGN PATENT DOCUMENTS

| | | |
|---|---|---|
| KR | 10-2014-0038855 A | 3/2014 |
| KR | 10-2014-0126606 A | 10/2014 |
| KR | 10-1651927 B1 | 8/2016 |

OTHER PUBLICATIONS

Communication dated Feb. 5, 2020, issued by the European Patent Office in counterpart European Application No. 19193805.9.

\* cited by examiner

FIG. 6

| | | | | | |
|---|---|---|---|---|---|
| ID:1-1 | ID:1-5 | ID:2-1 | ID:2-5 | ID:3-1 | ID:3-5 |
| ID:1-2 | ID:1-6 | ID:2-2 | ID:2-6 | ID:3-2 | ID:3-6 |
| ID:1-3 | ID:1-7 | ID:2-3 | ID:2-7 | ID:3-3 | ID:3-7 |
| ID:1-4 | ID:1-8 | ID:2-4 | ID:2-8 | ID:3-4 | ID:3-8 |
| ID:4-1 | ID:4-5 | ID:5-1 | ID:5-5 | ID:6-1 | ID:6-5 |
| ID:4-2 | ID:4-6 | ID:5-2 | ID:5-6 | ID:6-2 | ID:6-6 |
| ID:4-3 | ID:4-7 | ID:5-3 | ID:5-7 | ID:6-3 | ID:6-7 |
| ID:4-4 | ID:4-8 | ID:5-4 | ID:5-8 | ID:6-4 | ID:6-8 |
| ID:7-1 | ID:7-5 | ID:8-1 | ID:8-5 | ID:9-1 | ID:9-5 |
| ID:7-2 | ID:7-6 | ID:8-2 | ID:8-6 | ID:9-2 | ID:9-6 |
| ID:7-3 | ID:7-7 | ID:8-3 | ID:8-7 | ID:9-3 | ID:9-7 |
| ID:7-4 | ID:7-8 | ID:8-4 | ID:8-8 | ID:9-4 | ID:9-8 |

DISPLAY APPARATUS, METHOD OF CONTROLLING THE SAME AND RECORDING MEDIUM THEREOF

CROSS-REFERENCE TO THE RELATED APPLICATION

This application claims priority from Korean Patent Application No. 10-2018-0108693 filed on Sep. 12, 2018 in the Korean Intellectual Property Office, the disclosure of which is incorporated herein by reference in its entirety.

BACKGROUND

Field

Apparatuses and methods consistent with the exemplary embodiments relate to a display apparatus, a method of controlling the same, and a recording medium thereof, and more particularly to a display apparatus receiving a signal from a plurality of image sources, a method of controlling the same, and a recording medium thereof.

Description of the Related Art

A display apparatus, which displays content stored therein or received from an external image source to a user, has been used in various fields such as home, business, etc.

A modular display apparatus refers to a display apparatus, a screen of which is formed by attaching light source modules having a certain size like tiles.

Because the screen of the modular display apparatus is formed by the light source modules which include light emitting elements, the modular display apparatus provides an improved image quality in terms of brightness, contrast, color reproduction, black expression, etc., and is more efficient in terms of durability, efficiency of light emission, a life of a light source, power consumption, etc., as compared with the existing display apparatus using a backlight unit.

Further, the modular display apparatus may have various screen sizes and shapes as desired. For example, the modular display apparatus may be as big as a wall and be harmoniously installed in any place according to various combinations. Therefore, the applicability of the modular display apparatus is extending to a household large format display (LFD).

SUMMARY

According to an aspect of the exemplary embodiments, there is provided a display apparatus including: a display apparatus comprising: a display including a plurality of light source modules arrayed like tiles and mounted with a plurality of light emitting elements; an image processor configured to output a signal for displaying an image on a predetermined area of the display, the signal including image data and identification information about at least one light source module corresponding to the predetermined area; and a driver configured to selectively drive the at least one light source module corresponding to the identification information among the plurality of light source modules, based on the image data.

The plurality of light source modules may be divided into a plurality of module groups, and the driver may include a plurality of sub-drivers configured to respectively control the plurality of module groups.

Each of the plurality of sub-drivers may control at least one light source module included in each corresponding module group.

Each of the plurality of sub-drivers may be configured to output a driving signal to a first light source module among the plurality of light source modules included in each corresponding module group, and the first light source module may control light emitting elements of the first light source module based on the driving signal and output the driving signal to an adjacent light source module.

The driver may deactivate a part of the plurality of light source modules while the at least one light source module is displaying the image, based on the identification information.

The plurality of light source modules may be divided into a plurality of module groups, the display may display a plurality of images in a plurality of areas of the display, respectively, and the driver may drive light source modules of at least one module group corresponding to the plurality of areas, based on the identification information.

The identification information may indicate each of the light source modules of the at least one module group corresponding to the plurality of areas.

The driver may drive the light source modules of the at least one module group corresponding to the plurality of areas, based on at least one setting value among luminance, color gamut, or gamma included in the signal received from the image processor.

The setting value may be set based on characteristics of the plurality of images.

The image processor may output another signal for displaying a user interface (UI) for configuring sizes and positions of the plurality of images.

According to another aspect of the exemplary embodiments, there is provided a method of controlling a display apparatus, including: outputting a signal for displaying an image on a predetermined area of a display including a plurality of light source modules arrayed like tiles and mounted with a plurality of light emitting elements, the signal including image data and identification information about at least one light source module corresponding to the predetermined area of the display; and selectively driving the at least one light source module corresponding to the identification information among the plurality of light source modules, so that the image can be displayed using the image data by the at least one light source module.

The plurality of light source modules may be divided into a plurality of module groups, and the selectively driving includes driving the plurality of module groups using a plurality of drivers configured to respectively control the plurality of module groups.

The selectively driving may include controlling each of the plurality of drivers to output a driving signal to a first light source module among light source modules included in each corresponding module group, and the first light source module may control light emitting elements of the first light source module and output the driving signal to an adjacent light source module.

The selectively driving may include deactivating a part of the plurality of light source modules while the at least one light source module is displaying the image, based on the identification information.

The plurality of light source modules may be divided into a plurality of module groups, and the selectively driving may include controlling light source modules of at least one module group corresponding to the plurality of areas, based on the identification information.

The identification information may indicate each of the light source modules of the at least one module group corresponding to the plurality of areas.

The selectively driving may include controlling the light source modules of the at least one module group corresponding to the plurality of areas, based on at least one setting value among luminance, color gamut, or gamma included in the signal.

The setting value may be set based on characteristics of the plurality of images.

The method may further include: displaying a user interface (UI) for configuring sizes and positions of the plurality of images; and receiving a user's input through the displayed UI.

According to an aspect of the exemplary embodiments, there is provided a computer-readable nonvolatile recording medium recorded with a program of a method executable by a processor of a display apparatus, the method including: outputting a signal for displaying an image on a predetermined area of a display including a plurality of light source modules arrayed like tiles and mounted with a plurality of light emitting elements, the signal including image data and identification information about at least one light source module corresponding to the predetermined area of the display; and selectively driving the at least one light source module corresponding to the identification information among the plurality of light source modules, so that the image can be displayed using the image data by the at least one light source module.

BRIEF DESCRIPTION OF THE DRAWINGS

The above and/or the aspects will become apparent and more readily appreciated from the following description of exemplary embodiments, taken in conjunction with the accompanying drawings, in which:

FIG. 6 illustrates an example that ID is assigned to a plurality of light source modules in a display apparatus according to an exemplary embodiment;

DETAILED DESCRIPTION OF EXEMPLARY EMBODIMENTS

Figure 1:
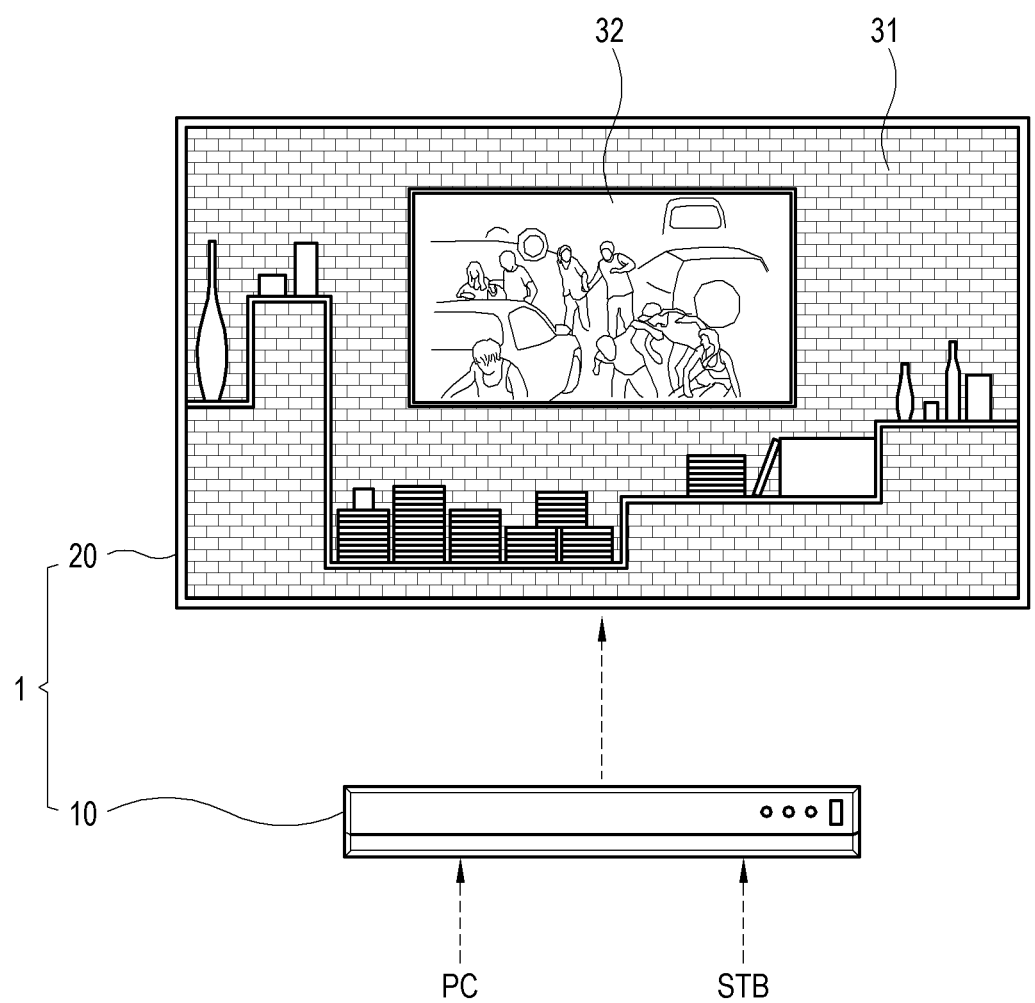
FIG. 1 illustrates an example of a display apparatus according to an exemplary embodiment.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide a display apparatus, of which a display screen is formed in units of a light source module and thus driven by corresponding image signals according to areas for displaying content, a method of controlling the same, and a recording medium thereof.

Another aspect of the disclosure is to provide a display apparatus, in which a plurality of pieces of content are respectively displayed on a plurality of areas of a screen, and an image improved in image quality corresponding to characteristics of each content is provided to a user, a method of controlling the same, and a recording medium thereof.

FIG. 1 illustrates an example of a display apparatus according to an exemplary embodiment of the disclosure.

As shown in FIG. 1, a display apparatus 1 according to an exemplary embodiment includes a main body 10 configured to output an image signal, and a display 20 configured to display an image.

The main body 10 outputs an image signal, which may be received from an external image source or stored therein, to the display 20.

In the display apparatus 1 according to an exemplary embodiment, the main body 10 may be, but is not limited to, a media box that outputs an image signal so that the display 20 can display images based on various kinds of content.

The main body 10 may receive content from a plurality of image sources, i.e. signal sources.

Examples of the image sources may include, but are not limited to, a set-top box (STB), a desktop or laptop computer (or personal computer, PC), a Blu-ray disc (BD), digital versatile disc (DVD) or the like optical disc player, a mobile device such as a smartphone, tablet or the like smart pad, etc. Further, the main body 10 may receive content by real-time streaming through a wired or wireless network.

According to an exemplary embodiment, the display apparatus 1 may be, but is not limited to, a television (TV) that displays broadcast content.

When the display apparatus 1 is the TV, the main body 10 may receive and process broadcast content based on at least one of a broadcast signal, broadcast information and broadcast data transmitted by a transmitter of a broadcasting station. The main body 10 may wirelessly receive a radio frequency (RF) signal, i.e., a broadcast signal, from the broadcasting station. To this end, the main body 10 may include an antenna configured to receive a broadcast signal, and a tuner configured to be tuned to a channel corresponding to a broadcast signal.

In the display apparatus 1, the signal source is not limited to the broadcasting station, and the broadcast signal may be received in the display apparatus 1 through a terrestrial wave, a cable, a satellite, etc. In other words, any apparatus or station capable of transceiving data may be included in the image source of the disclosure.

According to an exemplary embodiment, the display apparatus 1 may operate as a smart TV or Internet protocol (IP) TV. The smart TV refers to a TV that is capable of obtaining and displaying a broadcast signal in real time, has a web browsing function so that various pieces of content can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of service, and may for example provide services such as social network service, finance, news, weather, a map, music, a movie, a game, an electronic book, etc.

The standards for the signal received in the main body may be configured by various methods corresponding to the types of the apparatus. For example, image content may be received by wires based on a high definition multimedia interface (HDMI), composite video, component video, super video, syndicat des constructeurs d'appareils radiorécepteurs et téléviseurs (SCART), a universal serial bus (USB), and the like standards.

Further, the main body 10 may receive image content from various external apparatuses such as a server through wireless communication. The wireless communication is not limited to a particular method. The main body 10 may perform wireless communication based on an access point (AP), or may directly communicate with another device without the AP. For example, the main body 10 may receive content from an image source through Wi-Fi, Wi-Fi direct, Bluetooth or the like wireless communication.

The main body 10 and the display 20 are connected to each other by a wired or wireless interface, and an image signal is exchanged therebetween.

The wired interface may for example be a cable of predetermined standards. The wireless interface may for example be based on at least one of Wi-Fi, Wi-Fi direct or Bluetooth. In the disclosure, the connection between the main body 10 and the display 20 is not limited to the foregoing examples, and other wired or wireless interfaces may be applied according to various standards.

The display 20 includes a display panel 200 forming a screen where an image is displayed based on an image signal received from the main body 10.

Figure 2:
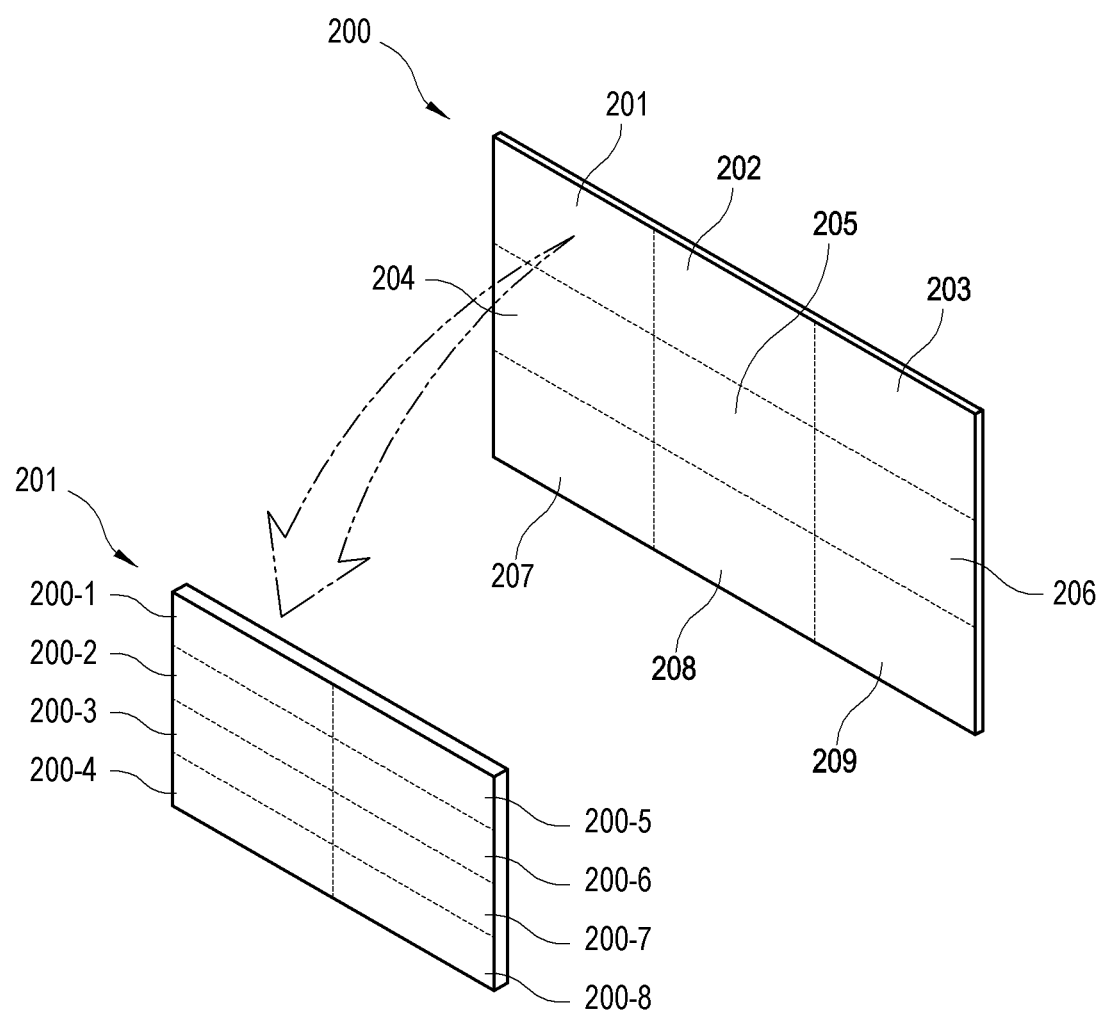
FIGS. 2 and 3 illustrate a configuration of a display panel of a display apparatus according to an exemplary embodiment.
Figure 3:
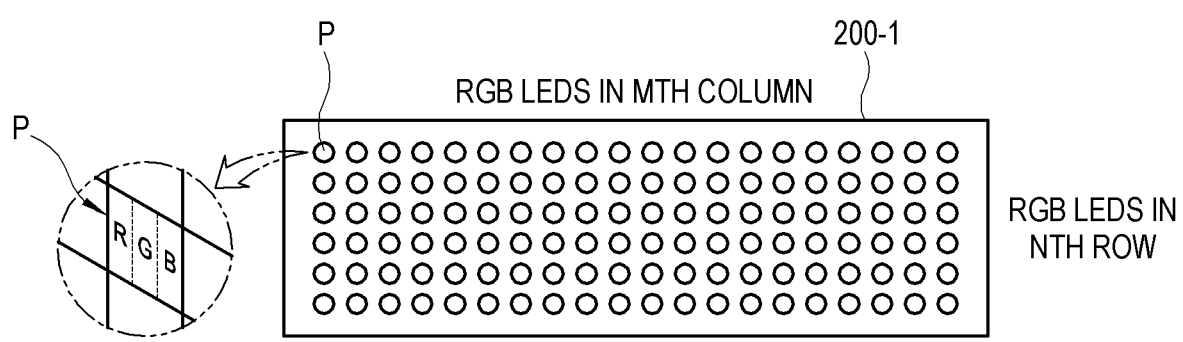

FIGS. 2 and 3 illustrate a configuration of a display panel of a display apparatus according to an exemplary embodiment of the disclosure.

The display panel 200 is divided into at least one block, and the blocks are configured to form a module group including a plurality of light source modules.

As shown in FIG. 2, the display panel 200 may include a plurality of blocks 201~209 by way of example. Alternatively, the display panel 200 may include a single block.

The blocks 200~209 are, as shown in FIG. 2, arrayed in rows and columns. In other words, the plurality of blocks 201~209 are arrayed in a matrix, for example, a matrix of 3×3 as shown in FIG. 2~. However, the number and array of the blocks 201~209 may vary according to exemplary embodiments.

The plurality of blocks 201~209 arrayed in a matrix are formed as a single screen to display an image.

According to an exemplary embodiment, the display 20 may include a plurality of drivers configured to respectively drive the plurality of blocks 201~209. In other words, each of the plurality of drivers may respectively drive a plurality of light sources included in the corresponding module group (i.e., block).

Each of the blocks 201~209 forming the display panel 200 may include the plurality of light source modules. FIG. 2 illustrates a plurality of light source modules 200-1~200-8 forming a screen in the block 201 by way of example. Like the block 201, another block may also include the plurality of light source modules.

The display apparatus 1 according to an exemplary embodiment may implement a large format display (LFD) installable on a wall in home or the like. The display 20 may be implemented as a tiled display in which the light source modules 200-1~200-8 are arrayed like tiles.

Each of the tiles, i.e., the light source modules 200-1~200-8 forming the display panel 200 may include a plurality of light emitting elements arrayed in a matrix.

Specifically, each of the light source modules 200-1~200-8, as shown in FIG. 3, may be mounted with a plurality of inorganic light emitting elements (hereinafter, also referred to as light emitting elements) such as light emitting diodes (LED). The inorganic light emitting elements may be mounted on each of the light source modules 200-1~200-8 in the form of a matrix of M×N, thereby forming the screen of the display panel 200.

FIG. 3 illustrates an array of a plurality of light emitting element within a light source module 200-1 by way of example. Likewise, another light source module may also include a plurality of light emitting elements arrayed as shown in FIG. 3. The number and array of light emitting elements to be mounted to each of the light source modules 200-1~200-8 may vary according to exemplary embodiments.

On the screen of the display panel 200, a plurality of pixels P are formed. The plurality of inorganic light emitting elements are provided to form the pixels P.

Each pixel P may include at least one of red (R), green (G) and blue (B) inorganic light emitting elements.

Each inorganic light emitting element is driven to emit light with a variety of brightness and colors in response to a control signal. An image displayed on the display panel 200 may be formed by combination of lights emitted from the plurality of pixels.

According to an exemplary embodiment, the light source module 200-1 based on the foregoing inorganic LED may be manufactured using a miniature LED in units of micrometer (μm), i.e., a micro LED, According to an exemplary embodiment, the display panel 200 having a screen formed by the plurality of light source modules 200-1~200-8 may display a predetermined content on a predetermined area (e.g., '31' in FIG. 1) of the screen. While displaying first content on a certain area 31 of the screen, the display panel 200 may display second content on a different area 32.

Here, the first content and the second content may be different kind of content from each other. For example, the first content may be a still image such as a picture, and the second content may be a moving image such as a movie. As shown in FIG. 1, the first content may be displayed as a wallpaper.

FIG. 1 illustrates the display apparatus 1 operating in a wall mode or an ambient mode, in which the wallpaper is displayed on the screen. However, the display apparatus 1 may not display the wallpaper. Further, the wallpaper is not limited to a still image, and may be a moving image.

As described above, the areas 31 and 32 of the screen for displaying the images may be formed using at least one light source module 200-1.

Accordingly, the light emitting elements of the areas 31 and 32 may be driven independently based on the attributes of the content. In other words, the light emitting element of the light source module 200-1 corresponding to the area 31 for displaying the first content, and the light emitting element of the light source module 200-1 corresponding to the area 32 for displaying the second content may be driven by different setting values corresponding to the characteristics of the content to be displayed The operation of driving the light emitting elements of the light source module 200-1 corresponding to each area of the screen will be described in detail below.

Figure 4:
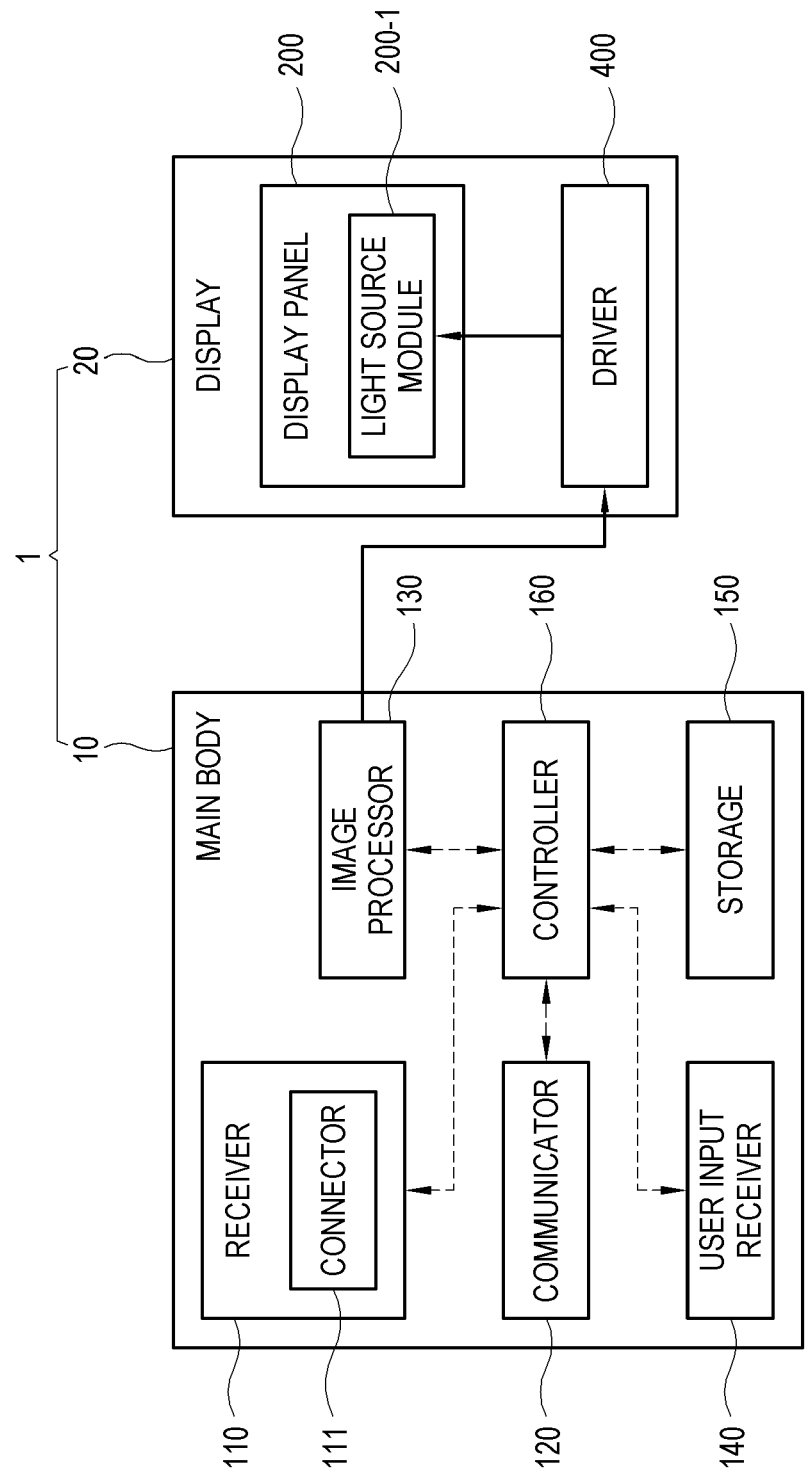
FIG. 4 is a block diagram of a display apparatus according to an exemplary embodiment.

FIG. 4 is a block diagram of a display apparatus 1 according to an exemplary embodiment.

As shown in FIG. 4, the main body of the display apparatus 1 according to an exemplary embodiment may include the main body 10 and the display 20. The main body 10 may include a receiver 110, a communicator 120, an image processor 130, a user input receiver 140, a storage 150, and a controller 160.

Figure 5:
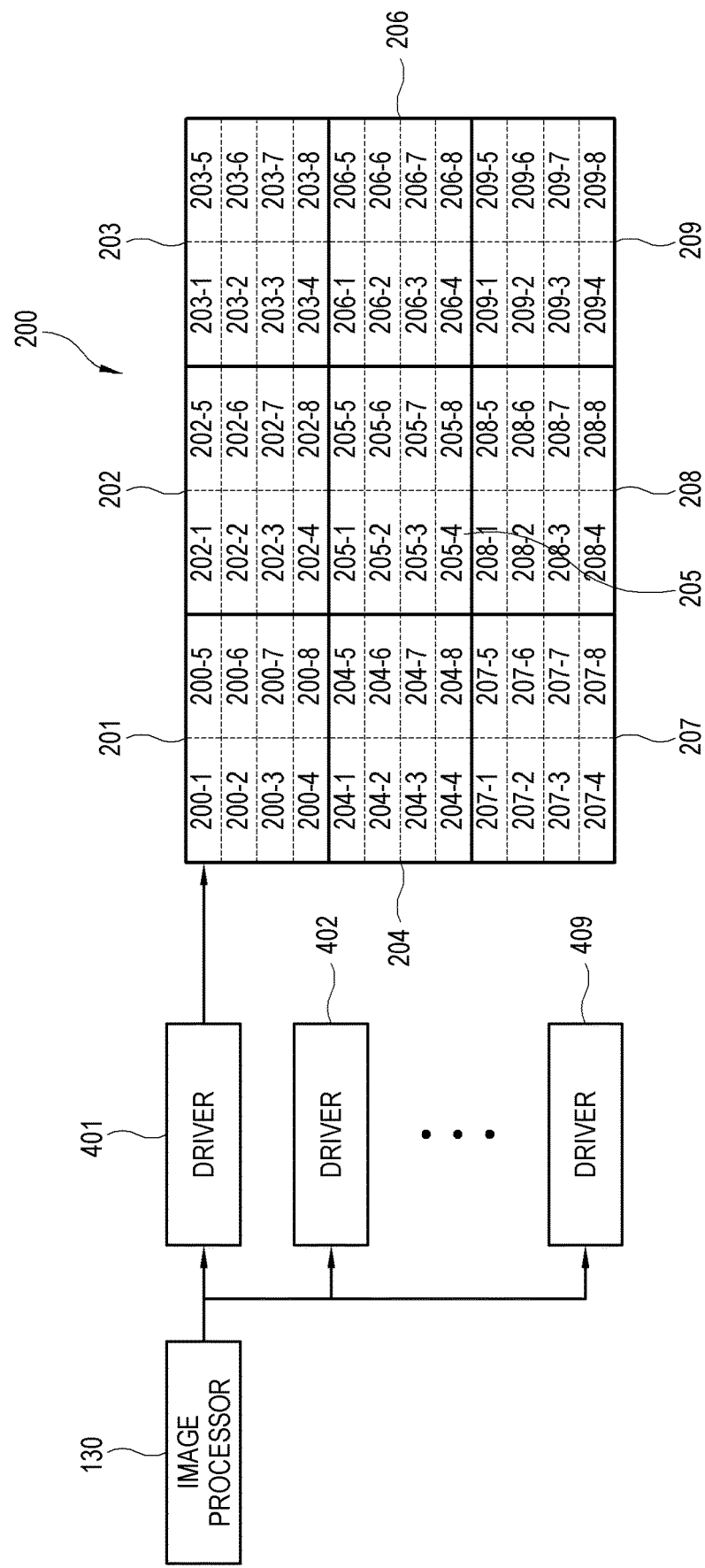
FIG. 5 is a block diagram of a display including a plurality of drivers in a display apparatus according to an exemplary embodiment.

The display 20 may include the display panel 200 and the driver 400. Here, the driver 400 and the display panel 200 may be provided in a timing controller (i.e., a T-con board) for processing image data and generating a timing control signal. As shown in FIG. 5, the driver 400 may include multiple sub-drivers 401~409 (hereinafter referred to as "drivers"). The driver 400, the controller 160, and the image processor 130 may be implemented by one or more processors.

The receiver 110 receives content from an image source. The receiver 110 may include a tuner to be tuned to a channel for a broadcast signal.

The receiver 110 includes a connector 111 through which the main body 10 connects with an external image source by a wire. The display apparatus 1 may receive content from an image source such as a set-top box through the wire-connected connector 111.

The connector 111 may be implemented by a communication circuitry including a data input/output interface where ports and communication modules (e.g., a S/W module, a chip, etc.) corresponding to various kinds of communication protocols are combined.

The connector 111 is basically provided to receive a signal from an image source, but may interactively transmit and receive a signal. For example, the image signal processed by the image processor 130 may be transmitted to the display 20 through the connector 111.

According to an exemplary embodiment, the connector 111 may be connected to the image source through an HDMI cable, but a connection method is not limited to the HDMI.

Further, the display apparatus 1 and the image source may be wirelessly connected by the communicator 120 which will be described later.

According to an exemplary embodiment, an apparatus to be connected to the display apparatus 1 by a cable through the connector 111 includes the image source such as a set-top box or a PC, but the disclosure is not limited to this embodiment. For example, according to an alternative exemplary embodiment, the display apparatus 1 may connect with a mobile apparatus by a cable through the connector 111.

The communicator 120 performs wireless communication with at least one external apparatus as the image source. The display apparatus 1 may wirelessly receive content from the image source through the communicator 120.

The communicator 120 may be implemented by a communication circuitry including communication modules (e.g. an S/W module, a chip, etc.) corresponding to various kinds of communication protocols.

According to an exemplary embodiment, the communicator 120 includes a wireless local area network (WLAN) unit. The WLAN unit may wirelessly connect with an external apparatus through an access point (AP) under control of the controller 160. The WLAN unit includes a Wi-Fi communication module.

According to an exemplary embodiment, the communicator 120 may include a short-range communication module configured to wirelessly support direct communication between the display apparatus 1 and the external apparatus without the AP. The short-range communication module may include at least one among Wi-Fi, Wi-Fi Direct, Bluetooth, Bluetooth low energy, RF communication, infrared data association (IrDA), Zigbee, ultrawideband (UWB), and near field communication (NFC). When the display apparatus 1 performs direct communication with the external apparatus, the storage 150 may be configured to store address information (e.g., media access control (MAC) address or Internet protocol (IP) address) about the external apparatus targeted for communication.

In the display apparatus 1 according to an exemplary embodiment, the communicator 120 may be configured to perform wireless communication with the external apparatus through at least one of the WLAN unit and the short-range communication module according to the performance.

The display apparatus 1 may include a wired communication module such as Ethernet and the like. The communicator 120 may include communication modules based on various communication methods such as long term evolution (LTE) or the like mobile communication, EM communication using a magnetic field, visible-ray communication, soundwave communication, etc.

According to an exemplary embodiment, the display apparatus 1 may receive moving-image content from image source such as an external server or the like through the communicator 120 by a real-time streaming method. For example, the display apparatus 1 may receive content through a streaming service such as Netflix, YouTube or the like.

The image processor 130 performs various preset image/sound processes with regard to the image signal of the content. The image processor 130 outputs an image signal generated or combined by image processing to the display 20, so that an image can be displayed on the display panel 200 based on the image signal. The image signal processed by the image processor 130 may be based on data stored in the nonvolatile storage such as a flash memory, a hard disk drive, etc.

The image processor 130 includes a decoder configured to decode an image signal to an image format suitable for the display apparatus 1, and a scaler configured to adjust the image signal to an output resolution suitable for the display panel 200. The decoder according to an exemplary embodiment may be implemented, for example, by a moving picture experts group (MPEG) decoder. However, the kind of content to be processed by the image processor 130 is not limited thereto. For example, the content to be processed by the image processor 130 may include a still image such as a picture of a JPEG file, wallpaper, etc. as well as a moving image such as a movie, etc.

The content to be processed by the image processor 130 may include image data corresponding to the image according to formats, and appended information of the image (i.e., metadata).

According to an exemplary embodiment, the image processor 130 may analyze an encoding type, a bit rate and a resolution of content to be processed, based on the metadata about the corresponding content, and perform image processing such as scaling factor control, sharpness control, peaking control, color enhancement, noise reduction (NR), etc. based on analysis results to improve image quality.

The image processing performed by the image processor 130 may vary according to exemplary embodiments. For example, the image processor 130 may perform at least one of various processes such as de-interlacing for converting an interlaced-type broadcast signal into a progressive-type broadcast signal, detail enhancement, frame refresh rate conversion, and line scanning.

The image processor 130 may be implemented by a group of individual elements for independently performing such processes, or may be implemented as included in a main system-on-chip (SoC) where many functions are integrated. The main SoC may include at least one micro-processor or central processing unit (CPU) as an example of the controller 160 (to be described later).

According to an exemplary embodiment, the image processor 120 may be implemented by a video board where various chipsets, a memory, electronic parts, wiring lines, and the like circuit components for performing such processes are mounted on to a printed circuit board (PCB). In this case, the image processor 130 and the controller 160 of the display apparatus 1 may be provided in a single video board. Of course, this is merely an example, and alternatively the image processor 130 and the processor controller 160 may be arranged in a plurality of printed circuit boards connectable with each other. The image processor 130 and the controller 160 may be implemented by one or more processors.

In the display apparatus 1 according to an exemplary embodiment the image processor 130 outputs an image signal to at least one driver 400 provided in the display 20.

According to an exemplary embodiment, the image processor 130 outputs a signal including image data, and identification information about at least one light source module corresponding to a certain area 31 of the display 20 to display an image, among the plurality of light source modules, to the driver 400. The driver 400 may selectively drive the light source module corresponding to the identification information among the plurality of light source modules. Thus, driving control is performed according to the screen areas, thereby selectively driving the light source module of the area in which the image will be displayed.

Specifically, the image processor 130 may output image data for displaying an image of content on a certain area 31 of the screen, and area information about the area 31 of the screen, on which the image will be displayed, to the driver 400. Here, the area information may include identification information about at least one light source module corresponding to the area 31 of the screen on which the image will be displayed.

The driver 400 may be configured to drive the light source module 200-1 corresponding to a certain area 31 on which the image will be displayed corresponding to the area information of the received signal.

According to an exemplary embodiment, the image processor 130 may output a signal, which includes image quality information and image data of the image to be displayed on at least one light source module corresponding to the certain area of the display 20, to the driver 400. Here, the signal output from the image processor 130 may further include identification information of the light source module corresponding to the area 31, on which the image will be displayed, so that the driver 400 can selectively drive the light source module corresponding to the identification information among the plurality of light source modules.

Specifically, the image processor 130 may output a signal which includes image data for displaying the image (i.e., the content), area information about the area 31 of the screen on which the image will be displayed, and image quality information indicating the characteristics of the displayed image, to the driver 400.

In other words, the image processor 130 may use the metadata of content to be processed to output a signal which includes image quality information about various setting values corresponding to the characteristics of the content to the driver 400. Here, the image quality information may indicate setting values such as the luminance, the color gamut, the gamma and the like for the light emitting elements of at least one light source module for displaying the image, i.e., the light source module forming the screen of the display panel 200. The setting values may be previously set for various characteristics of content.

The driver 400 may be configured to drive the light source module 200-1 corresponding to a certain area 31, on which an image is displayed corresponding to area information, based on the image quality information. In other words, the light emitting elements of the light source module 200-1 corresponding to the area 31 for displaying the image may emit light based on the image quality information, i.e., at least one setting value, corresponding the characteristics of the content (i.e., the image).

The user input receiver 140 transmits various preset control commands or unrestricted information based on a user's input to the controller 160. The user input receiver 140 may include a keypad (or an input panel) including buttons such as a power key, a menu key, and the like provided in the main body 10 of the display apparatus 1.

According to an exemplary embodiment, the user input receiver 140 may include an input device that generates a preset command/data/information/signal for remotely controlling the display apparatus 1 and transmits the command/data/information/signal to the display apparatus 1.

The input device may be provided separately from the main body 10 like a remote controller, and configured to obtain a user's input. The remote controller may include a touch sensor unit for detecting a user's touch input or a motion sensor unit for detecting its own motion caused by a user.

The input device may be implemented by a terminal such as a smart phone where a remote controller application is installed, and in this case a user's touch input can be made through a touch screen.

The input device may transmit a signal to the main body 10 of the display apparatus 1 through the wireless communication, and the wireless communication may employ at least one among Bluetooth, infrared communication, RF communication, WLAN, and Wi-Fi direct.

According to an exemplary embodiment, the user input receiver 140 may further include a sound receiver for obtaining a voice/sound uttered by a user. The sound receiver may be implemented by a microphone for obtaining a sound signal, and provided in the main body 10 or the remote controller.

The storage 150 may be configured to store various pieces of data of the display apparatus 1. The storage 150 may be implemented by a nonvolatile memory or a writable memory which can retain data even though the display apparatus 1 is powered off, and mirror changes. That is, the storage 150 may be provided as at least one among an HDD, a flash memory, electrically programmable ROM (EPROM) or electrically erasable and programmable ROM (EEPROM). The storage 150 may further include a volatile memory such as a dynamic RAM (DRAM) or static RAM (SRAM), of which reading or writing speed for the display apparatus 1 is faster than that of the nonvolatile memory.

Data stored in the storage 150 may for example include not only an operating system (OS) for driving the display apparatus 1 but also various software, programs, applications, image data, appended data, etc. executable on the OS.

The storage 150 may be configured to store graphic data autonomously provided by the display apparatus 1. The graphic data is output to the display 20 as a signal processed by the image processor 130, and may be displayed as graphics such as on-screen display (OSD), a graphic user interface (GUI, hereinafter also referred to as "user interface (UI)"), etc. in a certain area on the screen forming the display panel 200. Here, the output signal may further include the identification information of the light source module for displaying the graphics as the area information about the area of the screen for displaying the graphics.

According to an exemplary embodiment of the disclosure, the graphics displayed on the screen as described above include a graphic menu for operating the display apparatus 1.

According to an exemplary embodiment, the graphics include a UI through which the kind and number of content desired to be displayed on the screen of the display panel 200, and the size and position of the area in which each image of content will be displayed are selectable.

The controller 160 controls overall operations of the display apparatus 1. The controller 160 executes a control program (or an instruction) for performing such operations. The controller 160 may include at least one universal processor that loads at least a part of a control program from a nonvolatile memory, in which the control program is installed, to a volatile memory, and executes the loaded control program, and may for example be implemented by a CPU, an application processor (AP), or a microprocessor.

The processor may include a single core, a dual core, a triple core, a quad core, and the like multiple core. The processor may include a plurality of processors, for example, a main processor and a sub processor that operates in a sleep mode (during which only standby power is supplied without operation of the display apparatus). Further, the processor, the ROM, and the RAM may be connected to one another through an internal bus, and the ROM and the RAM belong to the storage 150.

In the disclosure, the processor, as an example of the controller 160, may be implemented as included in the main SoC mounted to the PCB internally provided in the display apparatus 1. Alternatively, the main SoC may further include the image processor 130.

The control program may include a program(s) achieved by at least one of a basic input/output system (BIOS), a device driver, an OS, a firmware, a platform, or an application. According to an exemplary embodiment, the application may be previously installed or stored in the display apparatus 1 when the display apparatus 1 is manufactured, or may be installed in the display apparatus 1 on the basis of application data received from the outside when it is required in the future. The application data may for example be downloaded from an external server such as an application market to the display apparatus 1. Such an external server is merely an example of the computer program product according to the disclosure, but not limited thereto.

According to an exemplary embodiment, the operation of the controller 160 may be implemented by a computer program stored in the computer program product (not shown) provided separately from the display apparatus 1. In this case, the computer program product includes a memory in which an instruction corresponding to a computer program is stored, and a processor. The instruction is given to make control to output a signal including the identification information of at least one light source module corresponding to a certain area of the display screen, and the image data of the image to be displayed on the area.

Accordingly, the display apparatus 1 downloads and executes the computer program stored in a separate computer program product and performs the operation of the controller 160.

The display panel 200 displays an image based on a signal processed by the image processor 130.

According to an exemplary embodiment, the driver 400 may be configured to drive the plurality of light source modules forming the screen of the display panel 200 in response to the signal received from the image processor 130 so that the image can be displayed as described above. Specifically, the driver 400 may be configured to drive at least one light emitting element, which forms a pixel P within the light source module of the area corresponding to the area information of the signal, to emit light in response to the image data of the signal output from the image processor 130. Here, the area information may include the identification information about the light source module involved in the area (see '31' in FIG. 1) where the image is displayed.

According to an exemplary embodiment, the driver 400 is configured to drive the light source module so that the light emitting elements of the light source module emit light based on the image quality information included in the signal, i.e., based on the setting values of the luminance, the color gamut, the gamma, etc., in response to the image data of the signal output from the image processor 130. Thus, the image having the improved image quality matching the characteristics of each content is provided to a user.

The driver 400 may be implemented by an integrated circuit (IC) provided to drive a light emitting element such as an LED or the like.

The driver 400~ may receive an image signal including image data and area information, and transmit an electric signal corresponding to the image data to each light emitting element of the light source module corresponding to the area information among the plurality of light source modules forming the screen of the display panel 200 based on the area information.

Here, the driver 400 may deactivate (i.e., turn off) the light source module corresponding to the area on which no image is to be displayed, based on the area information of the received image signal. Thus, the area in which an image is displayed is more highly visible.

In other words, the display panel 200 of the display apparatus 1 according to an exemplary embodiment employs light source modules to form the screen so that on/off control can be achieved for each light source module.

Accordingly, the driver 400 may selectively drive the light source module included in the area 31 on which an image is displayed, based on the area information of the image signal received from the image processor 130.

However, as necessary, the driver 400 may drive the light source modules, which are included in other areas than the area 31 on which the image is displayed, to display a black image according to light emission of their light emitting elements based on the area information of the image signal received from the image processor 130.

In the display apparatus 1 according to an exemplary embodiment, there may be a plurality of drivers 401, 402 . . . 409, as shown in FIG. 5.

Figure 7:
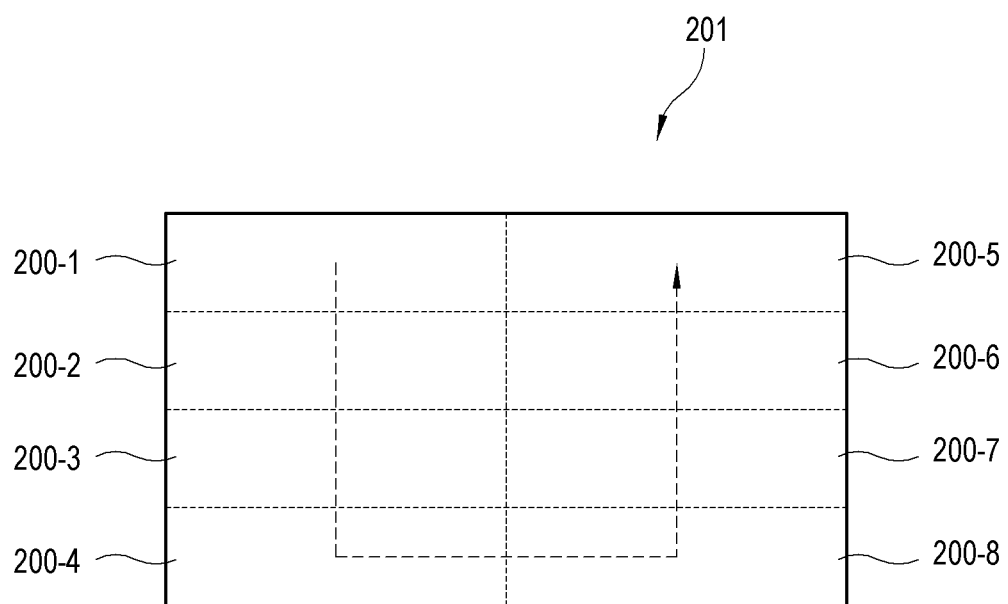
FIGS. 7 and 8 illustrate a light source module configured to form a display screen in a display apparatus according to an exemplary embodiment.
Figure 8:
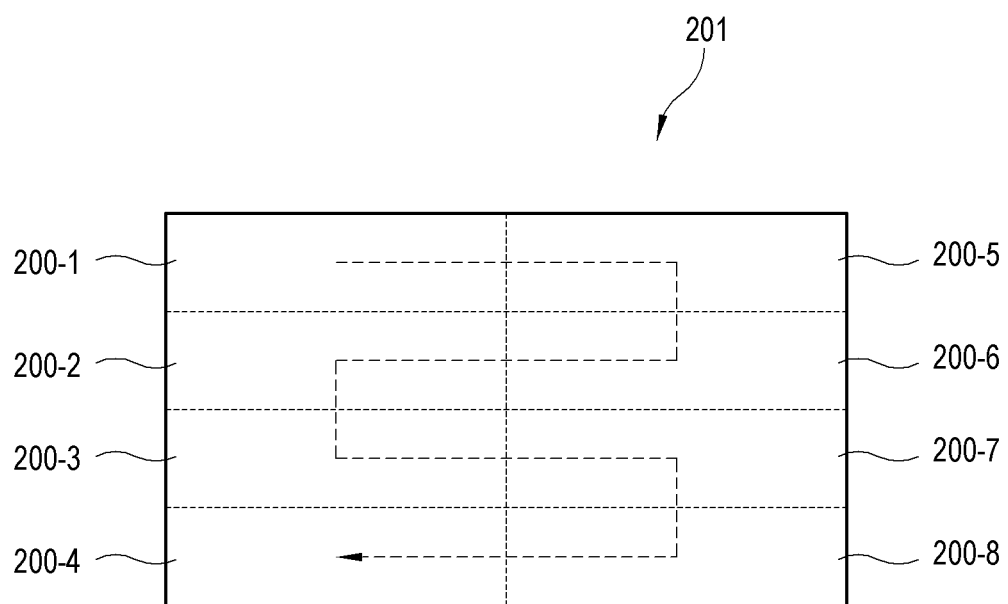

FIG. 5 is a block diagram of a display including a plurality of drivers in a display apparatus according to an exemplary embodiment. FIG. 6 illustrates a display panel 200 including a plurality of light source modules to which different IDs are assigned. FIGS. 7 and 8 illustrate a light source module configured to form a display screen in a display apparatus 1 according to an exemplary embodiment.

As shown in FIG. 5, the display 20 is provided with the plurality of drivers 401~409 which drive the plurality of light source modules 202~209.

According to an exemplary embodiment, the plurality of drivers 401~409 correspond to the plurality of blocks 201~209 forming the display panel 200. In other words, when the display panel 200 is divided by way of example into nine blocks 201~209 as shown in FIG. 5, nine drivers 401~409 may be provided to respectively control the divided blocks.

Here, the display 20 may include the T-con board corresponding to each of the blocks 201~209, and the T-con board may be mounted with the plurality of drivers 401~409 respectively corresponding to the plurality of blocks 201~209.

The image processor 130 outputs the image signal including the image data and the area information to the plurality of drivers 401~409.

Here, the area information may include identification (ID) assigned to each light source module, as the identification information about the light source module included in the area where an image is displayed. However, the area information in the disclosure is not limited to the ID of the light source module, and may include various pieces of information to identify the area for displaying an image of content of the display 20.

As shown in FIG. 6, as the information for identifying the light source module in a whole screen layout, an ID may be assigned to each of the plurality of light source modules forming the screen of the display panel 200. Here, the assigned ID may include information about the block, i.e., a group of the light source modules, and information about a position or connection order of the light source modules within the block.

The controller 160 may specify the light source module included in the area, on which an image of content is to be displayed, based on the ID assigned to each light source module, and control the image processor 130 to output a signal including the specified information.

According to an exemplary embodiment, the image processor 130 may output a signal to the driver which controls the block, i.e., the module group, including the light source module corresponding to the area information, among the plurality of drivers 401~409.

For example, an image signal including area information ID: 1-1~1-8 for the light source modules 200-1~200-8 included in the block 201 and image data corresponding to the area information may be output to the driver 401. Also, an image signal including area information ID: 2-1~2-8 for the light source modules 202-1~202-8 included in the block 202 and image data corresponding to the area information may be output to the driver 402. In the same manner, image signals including area information for the light source modules included in the blocks 203~209 and corresponding image data may be respectively output to the drivers 403~409.

According to an exemplary embodiment, when the image signals are transmitted to the drivers 401~409 by the foregoing manner, the drivers 401~409 drive the light source modules included in the blocks 201~209 based on the area information of the received signal in accordance with the image data. Thus, efficient driving control is possible while reducing load of the drivers.

According to an alternative exemplary embodiment, the image processor 130 may output an image signal to one among the plurality of drivers 401~409, and each driver may obtain image data corresponding to the light source module included in the block corresponding to the area information of the image signal. Here, the plurality of drivers 401~409 may be connected in the form of a daisy chain.

For example, the image processor 130 outputs an image signal to the driver 401, and the driver 401 obtains, i.e., captures, image data corresponding to the light source modules 200-1~200-8 (ID: 1-1~1-8) included in the block 201 based on the area information of the received image signal. The driver 401 outputs, i.e., delivers, the image signal received from the image processor 130 to the driver 402.

The driver 402 obtains, i.e., captures, image data corresponding to the light source modules 202-1~202-8 (ID: 2-1~2-8) included in the corresponding block 202 based on the area information of the image signal received from the driver 401. The driver 402 outputs, i.e., delivers, the image signal received from the driver 401 to the driver 403.

According to another exemplary embodiment, the image signal may be transmitted to the plurality of drivers 401~409 by the foregoing method, and the drivers 401~409 may drive the light source modules included in the corresponding the blocks 201~209 based on the image data.

According to still another exemplary embodiment, the plurality of blocks 201~209 may be divided into groups, and the image processor 130 may output the image signal to one of the drivers corresponding to the blocks included in each group. Here, the plurality of drivers are connected in the form of a daisy chain.

For example, when the blocks 201, 204 and 207 are set into one group, the image processor 130 outputs the image signal, which includes area information ID: 1-1~1-8, ID: 4-1~4-8, and ID: 7-1~7-8 of the light source modules included in the blocks 201, 204 and 207 and the image data corresponding to the area information, to the driver 401 corresponding to the block 201.

The driver 401 obtains, i.e. captures, the image data corresponding to the light source modules 200-1~200-8 (ID: 1-1~1-8) included in the block 201 based on the area information ID: 1-1~1-8, ID: 4-1~4-8, ID: 7-1~7-8 of the received image signal. The driver 401 outputs, i.e., delivers the image signal received from the image processor 130 to the driver 404.

The driver 404 obtains, i.e., captures, the image data corresponding to the light source modules 204-1~204-8 (ID: 4-1~4-8) included in the block 204 based on the area information ID: 1-1~1-8, ID: 4-1~4-8, and ID: 7-1~7-8 of the image signal received from the driver 401. The driver 402 outputs, i.e., delivers, the image signal received from the driver 401 to the driver 407.

According to yet another exemplary embodiment, the image signal is transmitted to each of the plurality of drivers 401, 404 and 407 corresponding to the group including the blocks 201, 204 and 207 by the same manner as described above, and each of the drivers 401, 404 and 407 drives the light source modules included in the corresponding blocks 201, 204 and 207 based on the image data.

In the same manner, the blocks 202, 205 and 208 may be set into one group, and the blocks 203, 206 and 209 may be set into one group. The image signal is transmitted to the drivers corresponding to the respective groups, and thus the light source modules included in the corresponding blocks are driven based on the image data.

The foregoing exemplary embodiments describe that, when the plurality of drivers 401~409 are provided in the display 20, each driver receives the image signal and drives the light emitting element of the corresponding light source module. However, the disclosure is not limited to the foregoing embodiments.

For example, the drivers 401~409 may identify whether an area of displaying an image belongs to their corresponding blocks 201~209, based on area information of an image signal output from the image processor 130, and drive the light source module of the block corresponding to identification results.

Accordingly, by various methods applicable from the foregoing exemplary embodiments, each driver receives a signal including image data and area information, and generates a driving signal based on the received signal, thereby driving the corresponding light source module so that the light emitting elements within the driven light source module can emit light.

According to various exemplary embodiments as described above, the drivers 401~409 may receive the image signal including the image data and the area information, and drive the light source modules within the corresponding blocks 201~209 based on the area information, thereby displaying an image of content corresponding to the light source modules on the display panel 200. Here, the plurality of light source modules in the blocks 201~209 to be driven by the drivers 401~409 may receive driving signals by a daisy chain method.

Specifically, the driver 401 drives the light source modules 200-1~200-9 in sequence based on the received image data and the received area information, and an example of transmitting the driving signals to the light source modules 200-1~200-9 is as shown in FIG. 7. Other drivers 402~409 may also transmit the driving signals to the light source modules within the corresponding blocks 202~209 in the same order and drive the corresponding light source modules.

In the disclosure, the order of driving the light source modules 200-1~200-9 in the blocks 201~209 is not limited to the example shown in FIG. 7. In other words, for example, the block 201 corresponding to the driver 401 transmits the driving signals to the light source modules 200-1~200-9 in the order shown in FIG. 8, thereby driving the light source modules 200-1~200-9.

Below, exemplary embodiments of displaying an image based on content in a predetermined area on the screen in the display apparatus 1 according to the disclosure will be described with reference to the accompanying drawings.

Figure 9:
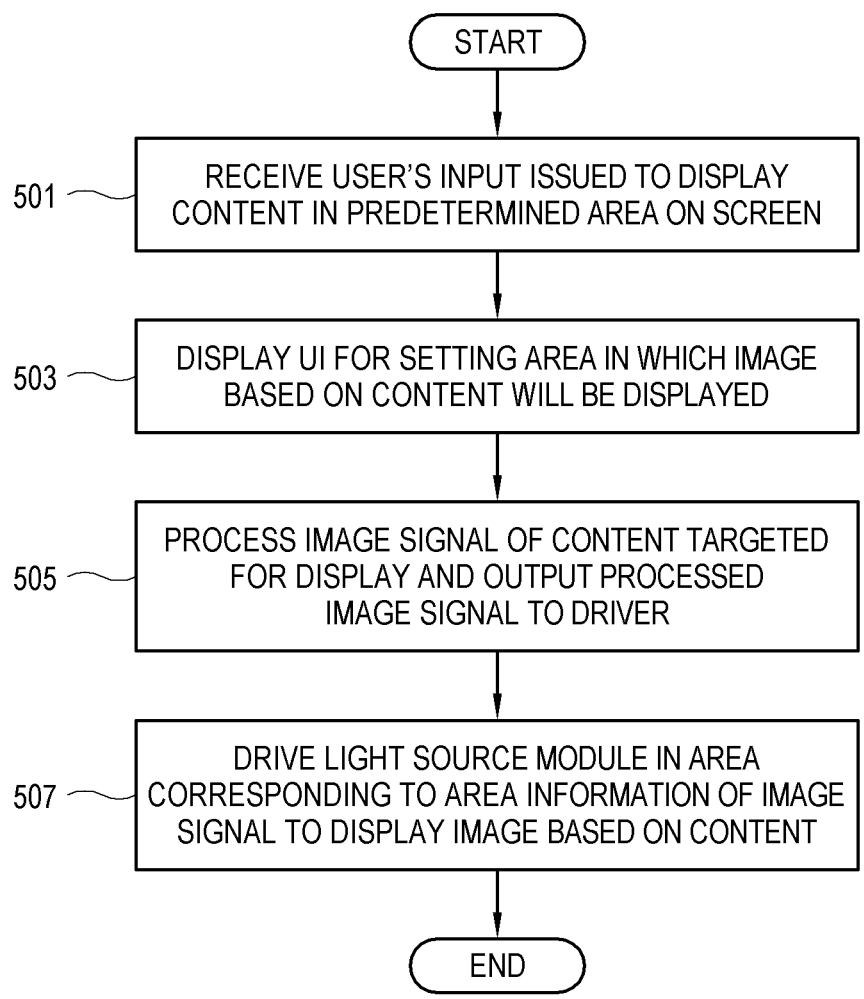
FIG. 9 is a flowchart showing a method of controlling a display apparatus according to an exemplary embodiment.

FIG. 9 is a flowchart showing a method of controlling a display apparatus according to an exemplary embodiment.

As shown in FIG. 9, the display apparatus 1 receives a user's input for specifying a predetermined area on the screen of the display panel 200 to display content (501). Here, a user's input may indicate that a plurality of pieces of content is to be displayed on a plurality of areas of the screen, respectively.

Figure 10:
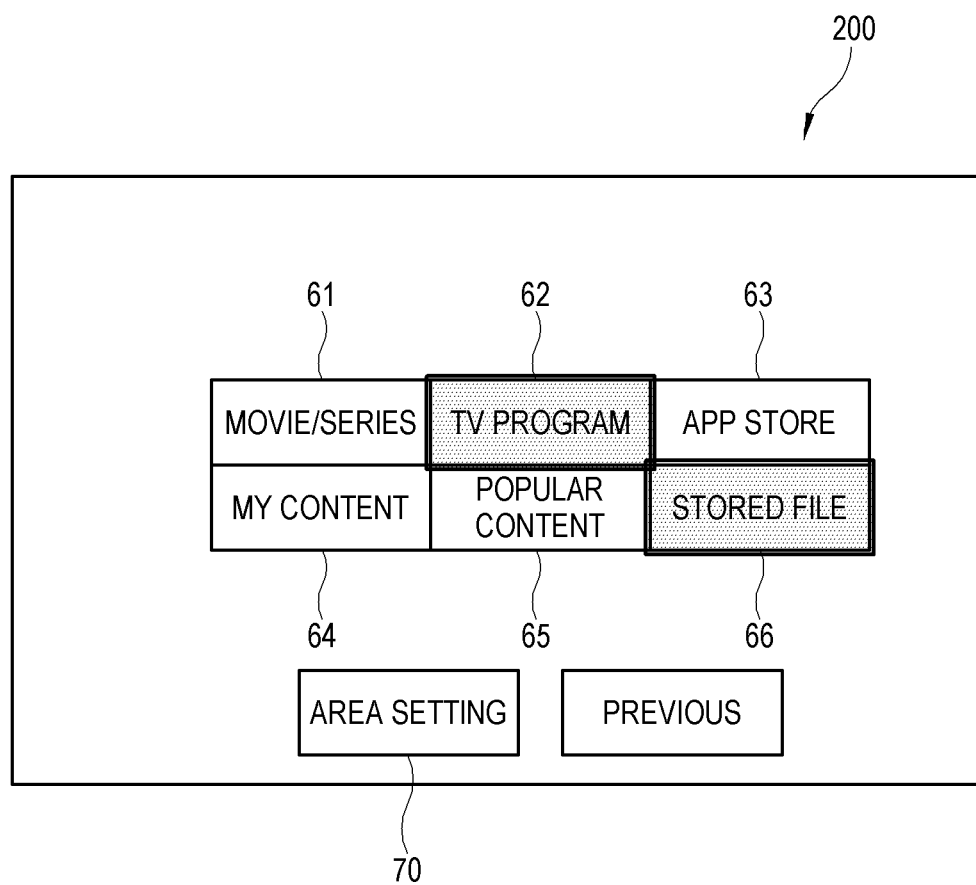
FIGS. 10 and 11 illustrate examples of a user interface (UI) for setting a plurality of pieces of content to be displayed on a plurality of areas in a display apparatus according to an exemplary embodiment.
Figure 11:
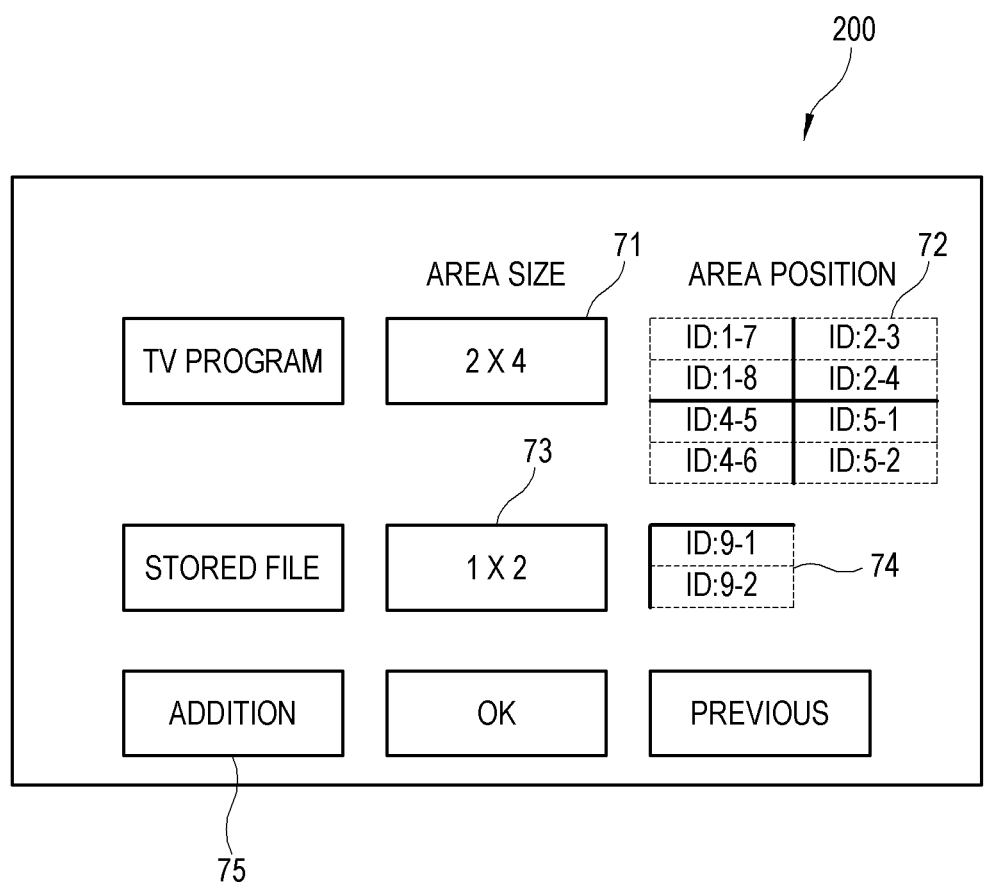
Figure 12:
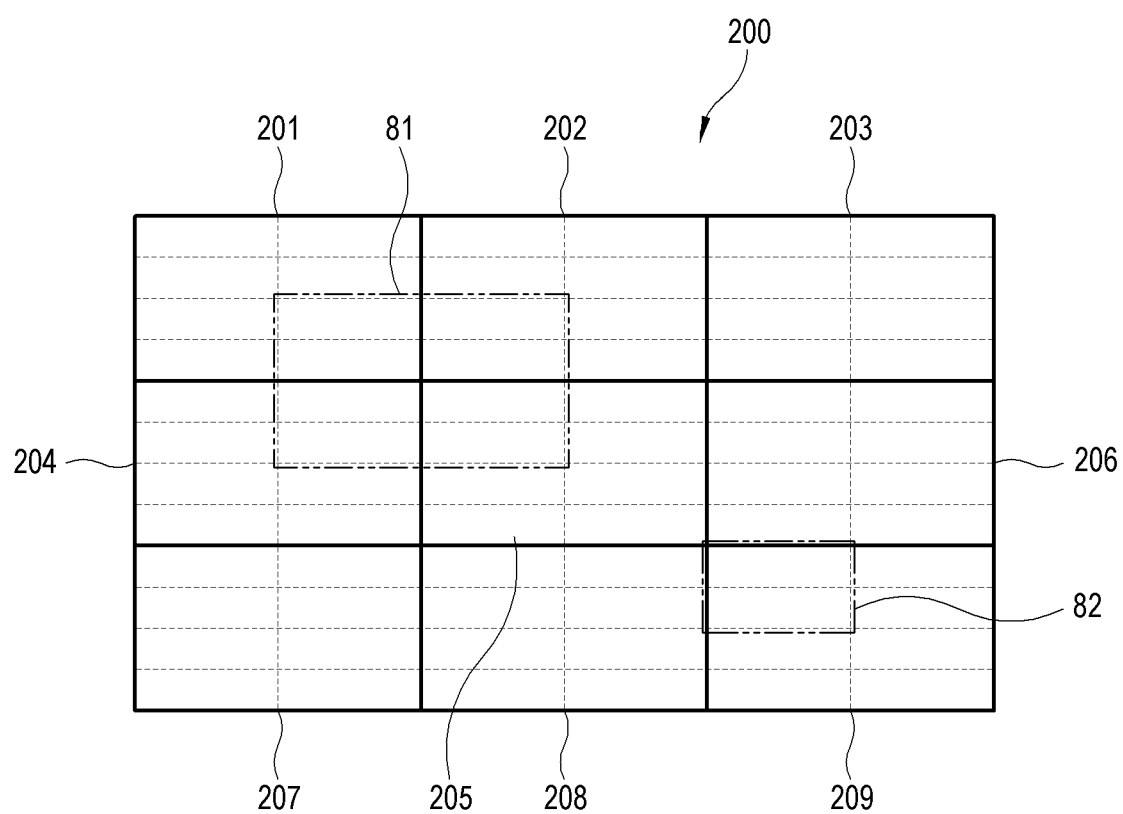
FIGS. 12 to 14 illustrate a plurality of pieces of content is displayed as images on a plurality of areas, based on selection in the UI of FIGS. 10 and 11, according to an exemplary embodiment.
Figure 13:
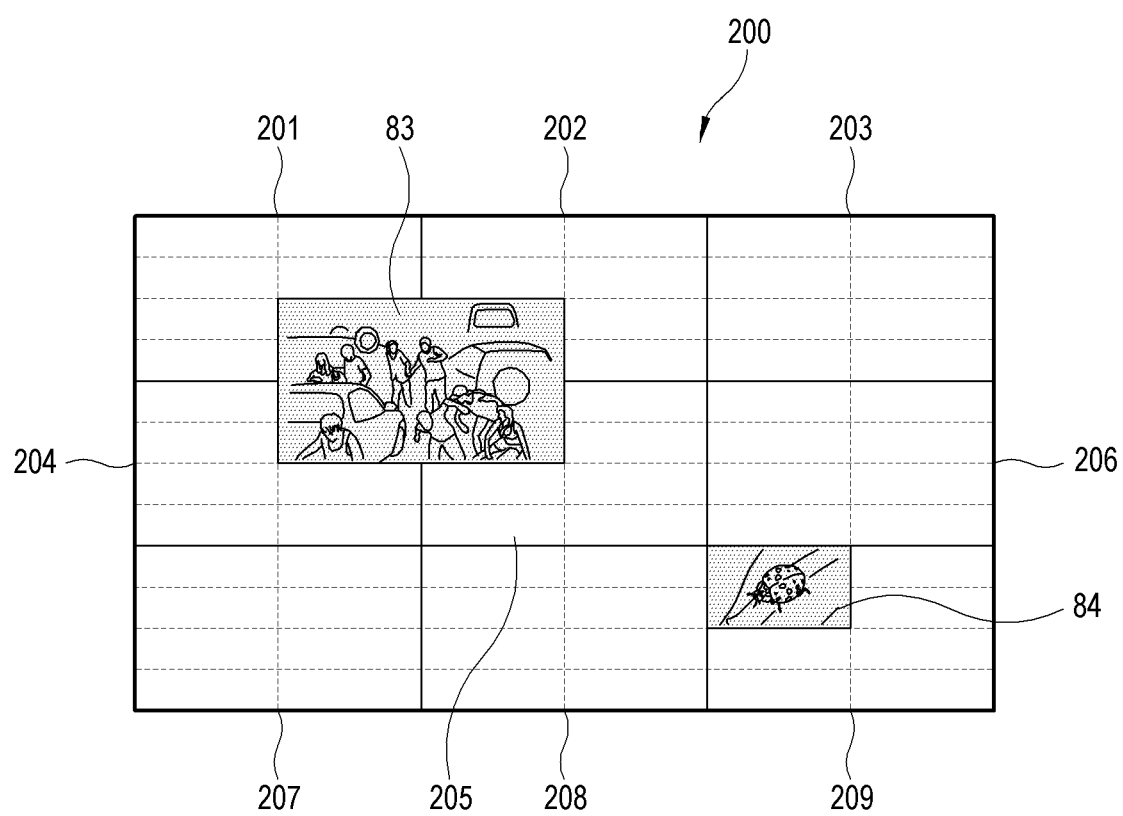
Figure 14:
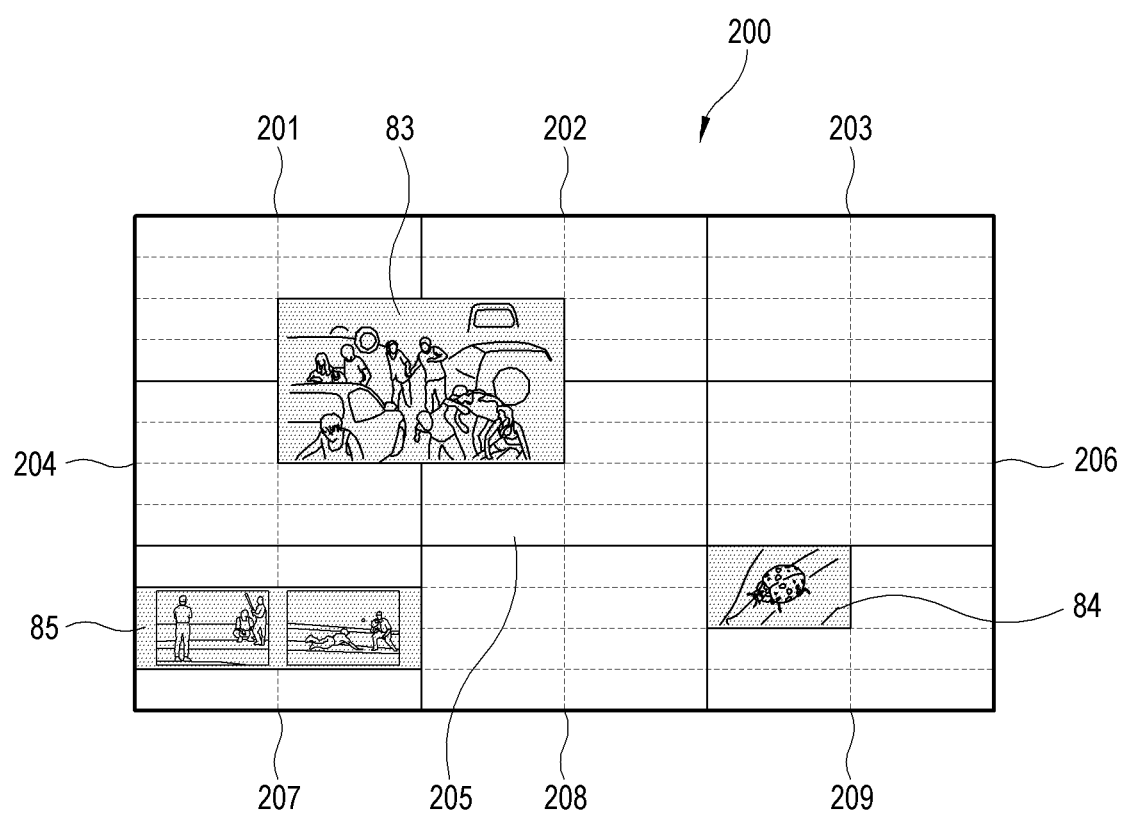

FIGS. 10 and 11 illustrate examples of a UI for setting a plurality of pieces of content to be displayed on a plurality of areas in a display apparatus according to an exemplary embodiment. FIGS. 12 to 14 illustrate examples of a screen on which a plurality of pieces of content is displayed as images on a plurality of areas, based on selection in the UI of FIGS. 10 and 11.

As shown in FIG. 10, a plurality of selectable items 61~66 corresponding to the plurality of pieces of content a user wants to view are displayed on the screen of the display panel 200.

A user uses the user input receiver 140 to select at least one item 62, 66 corresponding to the content desired to be reproduced in the display apparatus 1 among the plurality of items 61~66. Here, as shown in FIG. 10, a user selects the plurality of items 62 and 66, so that a plurality of pieces of content corresponding to the plurality of selected items 62 and can be respectively displayed on the plurality of areas of the screen.

According to an exemplary embodiment, while a first content is displayed on a certain area on the screen of the display panel 200, a user may select a second content different from the first content, to be displayed in another area on the screen of the display panel 200. For example, referring to FIG. 10, while the image based on the first content, i.e., a TV program (or a broadcast program), is being displayed on the screen, a user may select the second content, i.e., a stored file (e.g. a picture, a document, etc.), to be additionally displayed on the screen.

According to an alternative embodiment, a user may select multiple items at a time to display a plurality of pieces of content on a plurality of areas on the screen, respectively. For example, a user may select the first content, i.e., the TV program and the second content, i.e., the stored file (see FIG. 10), to be displayed on the different areas of the screen.

In other words, the plurality of pieces of content may be simultaneously displayed in the plurality of areas on the screen, but a user may select another content to be additionally displayed on the screen at any time.

Returning to FIG. 9, the display apparatus 1 receives a user's input for setting an area of the screen, on which the content will be displayed (503).

Here, the controller 160 may control the image processor 130 and the display panel 200 to display a UI through which an area for displaying an image of content thereon is set. For example, when a user further selects an area setting item 70 in the state that the TV program item 62 and the stored file item 66 are selected as shown in FIG. 10, an area setting UI may be displayed on the display panel 200 as shown in FIG. 11. Thus, convenience in user control is improved.

According to an exemplary embodiment, as shown in FIG. 11, the area setting UI may include menu items 71 and 73 for setting the sizes of the areas in which images are to be displayed according to the plurality of pieces of content, and menu items 72 and 74 for selecting the positions at which the images are displayed corresponding to the set sizes.

For example, as shown in FIG. 11, a user may select the first content, i.e., the TV program, to be displayed on the first area including 2×4 light source modules with ID: 1-7, 1-8, 2-3, 2-4, 4-5, 4-6, 5-1 and 5-2, and select the second content, i.e., the stored file, to be displayed in the second area including 1×2 light source modules with ID: 9-1 and 9-2.

Here, a user may independently set the position and the size of the display areas. In other words, according to an exemplary embodiment, a user may adjust the menu items 71 and 72 corresponding to the first content, i.e., the TV program, and the menu items 73 and 74 corresponding to the second content, i.e., the stored file, at different times.

In the same manner as described above, a first area 81 for displaying first content and a second area 82 for displaying second content are shown in FIG. 12.

According to an exemplary embodiment, a user may select an addition button 75 to additionally display an image corresponding to the third content different from the first content and the second content in another area on the screen. When the addition button 75 is selected, the controller 160 controls the display panel 200 to display the UI of FIG. 10, and allows a user to select an item (e.g. a game item 65, etc.) corresponding to content desired to be displayed as the third content.

Based on the display area setting in the operation 503 in FIG. 9, the controller 160 processes an image signal of content to be displayed, and controls the image processor 130 to output the processed image signal to the driver 400 (505). Here, the image signal processed and output by the image processor 130 includes image data of content and area information (e.g., ID of the light source module included in the display area) indicating an area on the screen, in which the image of the content will be displayed.

Specifically, the image processor 130 analyzes an encoding type, a bit rate and a resolution of content to be processed, based on the appended information, i.e., metadata, about the corresponding content, and performs scaling factor control, sharpness control, peaking control, color enhancement, noise reduction (NR), etc. based on analysis results to improve image quality.

In the operation 505, when the plurality of pieces of content is displayed on the display panel 200, the controller 160 may process the image signal, which includes the image data about the plurality of pieces of content, and the area information indicating the plurality of areas on the screen for displaying the images based on the plurality of pieces of content, and output the processed image signal to the driver 400. Here, as shown in FIG. 6, when the display apparatus 1 is provided with the plurality of drivers 401~409, each driver may receive or capture the image signal corresponding to the area information of the driving module included in the corresponding block, i.e. the module group.

Further, the drivers 401~409 may drive the light source modules of the corresponding areas based on the area information of the image signal received from the image processor 130 so that the light emitting elements of the driven light source modules can emit light, thereby displaying an image based on the corresponding content (507).

Here, as shown in FIG. 6, when the display apparatus 1 includes the plurality of drivers 401~409, each driver may drive the light source module in the corresponding area, based on the area information included in the received or captured image signal.

In other words, the drivers 401, 402, 404 and 405 may drive the light source modules included in the first area 81 as shown in FIG. 12 based on the area information of the image signal received from the image processor 130. Further, the driver 409 may drive the light source module included in the second area 82 as shown in FIG. 12 based on the area information of the image signal received from the image processor 130.

According to an exemplary embodiment, the drivers 401~409 may perform control not to drive but turn off the light source modules in areas other than the first area 81 and the second area 82, based on the area information of the image signal, which indicates that there is no content to be displayed outside the first area 81 and the second area 82.

According to an alternative exemplary embodiment, the drivers 401~409 may drive the light emitting elements of the light source modules included in other areas except the first area 81 and the second area 82 to display a black image, based on the area information of the image signal received from the image processor 130, which indicates that there is no content to be displayed outside the first area 81 and the second area 82.

As shown in FIG. 13, a broadcast program 83 corresponding to a predetermined channel is displayed on the first area 81 as first content, and a stored file, e.g., a picture 84, stored in the apparatus is displayed on the second area 82 as second content.

According to an exemplary embodiment, a user may for example select the addition button 75 shown in FIG. 11, so that one or more pieces of content (for example, the third content) different from the first content 83 and the second content 84 can be further displayed in the third area on the screen. Here, the third area may be positioned outside the first area 81 for the first content 83 and the second area 82 for the second content 84. When the addition button 75 is selected, the controller 160 controls the display panel 200 to display the UI of FIG. 10, thereby allowing a user to select an item 65 for additional content (e.g., game content) to be displayed as the third content, and receiving a user's input about the size and position of an area for displaying the third content through the UI of FIG. 11.

Accordingly, as shown in FIG. 14, the broadcast program 83 corresponding to a predetermined channel is displayed on the first area 81 as the first content; the stored file, e.g. the picture 84 stored in the apparatus is displayed on the second area 82 as the second content; and a predetermined game image 85 is displayed on the third area.

As described above, the display apparatus 1 according to an exemplary embodiment selectively drives the light source module corresponding to the predetermined area for displaying content, based on the area information and the image data which are included in the image signal.

In the foregoing display apparatus 1, the light source modules included in the areas corresponding to the plurality of pieces of content are driven based on the area information and the image data, so that the images based on the plurality of pieces of content different from one another can be respectively displayed in the plurality of areas on the screen.

With this operation, the display apparatus 1 simultaneously displays the plurality of pieces of content on the screen, and the screen areas of displaying the content are driven independently of one another, thereby providing images with improved quality matching the characteristics of the corresponding content, to a user. Further, the light source modules in areas displaying no images may be turned off, and therefore the displayed image is more highly visible.

As described above, according to the exemplary embodiments, a light source module of an area, in which content is displayed, may be selectively driven among a plurality of light source modules forming a screen of a display panel, based on area information included in an image signal, and therefore different areas of the screen may be controlled independently.

Further, different images may be displayed simultaneously while each image is displayed in quality matching the characteristics of the corresponding content.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display comprising a plurality of light source modules arrayed like tiles and mounted with a plurality of light emitting elements, the plurality of light emitting elements being provided to form a plurality of pixels;
   an image processor configured to output a signal for displaying an image in full on a partial area of the display, the signal comprising image data and identification information about at least one light source module corresponding to the partial area; and
   a driver configured to selectively drive the at least one light source module based on the identification information and the image data, such that at least one remaining light source module other than the at least one light source module corresponding to the partial area is deactivated while the at least one light source module corresponding to the partial area is displaying the image in full.

2. The display apparatus according to claim 1, wherein
   the plurality of light source modules are divided into a plurality of module groups, and
   the driver comprises a plurality of sub-drivers configured to respectively control the plurality of module groups.

3. The display apparatus according to claim 2, wherein each of the plurality of sub-drivers controls at least one light source module included in each corresponding module group.

4. The display apparatus according to claim 2, wherein each of the plurality of sub-drivers is configured to output a driving signal to a first light source module among the plurality of light source modules included in each corresponding module group, and
   the first light source module controls light emitting elements of the first light source module based on the driving signal, and outputs the driving signal to an adjacent light source module.

5. The display apparatus according to claim 1, wherein
   the plurality of light source modules are divided into a plurality of module groups,
   the display displays a plurality of images in a plurality of areas of the display, respectively, and
   the driver drives light source modules of at least one module group corresponding to the plurality of areas, based on the identification information.

6. The display apparatus according to claim 5, wherein the identification information indicates each of the light source modules of the at least one module group corresponding to the plurality of areas.

7. The display apparatus according to claim 5, wherein the driver drives the light source modules of the at least one module group corresponding to the plurality of areas, based on at least one setting value among luminance, color gamut, or gamma included in the signal received from the image processor.

8. The display apparatus according to claim 7, wherein the setting value is set based on characteristics of the plurality of images.

9. The display apparatus according to claim 5, wherein the image processor outputs another signal for displaying a user interface (UI) for configuring sizes and positions of the plurality of images.

10. A method of controlling a display apparatus, comprising:
    outputting a signal for displaying an image in full on a partial area of a display comprising a plurality of light source modules arrayed like tiles and mounted with a plurality of light emitting elements, the plurality of light emitting elements being provided to form a plurality of pixels, the signal comprising image data and identification information about at least one light source module corresponding to the partial area of the display; and
    selectively driving the at least one light source module based on the identification information and the image data, such that at least one remaining light source module other than the at least one light source module corresponding to the partial area is deactivated while the at least one light source module corresponding to the partial area is displaying the image in full.

11. The method according to claim 10, wherein
    the plurality of light source modules are divided into a plurality of module groups, and
    the selectively driving comprises driving the plurality of module groups using a plurality of drivers configured to respectively control the plurality of module groups.

12. The method according to claim 11, wherein
    the selectively driving comprises controlling each of the plurality of drivers to output a driving signal to a first light source module among light source modules included in each corresponding module group, and
    the first light source module controls light emitting elements of the first light source module, and outputs the driving signal to an adjacent light source module.

13. The method according to claim 10, wherein
    the plurality of light source modules are divided into a plurality of module groups, and
    the selectively driving comprises controlling light source modules of at least one module group corresponding to the plurality of areas, based on the identification information.

14. The method according to claim 13, wherein the identification information indicates each of the light source modules of the at least one module group corresponding to the plurality of areas.

15. The method according to claim 13, wherein the selectively driving comprises controlling the light source modules of the at least one module group corresponding to the plurality of areas, based on at least one setting value among luminance, color gamut, or gamma included in the signal.

16. The method according to claim 15, wherein the setting value is set based on characteristics of the plurality of images.

17. The method according to claim 13, further comprising:

displaying a user interface (UI) for configuring sizes and positions of the plurality of images; and receiving a user's input through the displayed UI.

18. A non-transitory computer-readable nonvolatile recording medium recorded with a program of a method executable by a processor of a display apparatus, the method comprising:

outputting a signal for displaying an image in full on a partial area of a display comprising a plurality of light source modules arrayed like tiles and mounted with a plurality of light emitting elements, the plurality of light emitting elements being provided to form a plurality of pixels, the signal comprising image data and identification information about at least one light source module corresponding to the partial area of the display;

selectively driving the at least one light source module based on the identification information and the image data, such that at least one remaining light source module other than the at least one light source module corresponding to the partial area is deactivated while the at least one light source module corresponding to the partial area is displaying the image in full.

* * * * *